(12) United States Patent
Roychowdhury et al.

(10) Patent No.: US 10,698,386 B2
(45) Date of Patent: Jun. 30, 2020

(54) SCAN PATH GENERATION FOR A ROTARY ADDITIVE MANUFACTURING MACHINE

(71) Applicant: General Electric Company, Schenectady, NY (US)

(72) Inventors: Subhrajit Roychowdhury, Niskayuna, NY (US); Brian McCarthy, Niskayuna, NY (US); Michael Tucker, Niskayuna, NY (US); David C Bogdan, Jr., Charlton, NY (US); Michael Evans Graham, Slingerlands, NY (US); William Carter, Galway, NY (US)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 15/787,189

(22) Filed: Oct. 18, 2017

(65) Prior Publication Data

US 2019/0113907 A1 Apr. 18, 2019

(51) Int. Cl.
*G05B 19/4099* (2006.01)
*B22F 3/105* (2006.01)
(Continued)

(52) U.S. Cl.
CPC ......... *G05B 19/4099* (2013.01); *B22F 3/105* (2013.01); *B22F 3/1055* (2013.01);
(Continued)

(58) Field of Classification Search
CPC ..... G05B 19/4099; G06T 17/00; B22F 3/105; B22F 2003/1057; B33Y 10/00; B33Y 50/00
See application file for complete search history.

(56) References Cited

U.S. PATENT DOCUMENTS

| | | | | |
|---|---|---|---|---|
| 5,390,112 A | * | 2/1995 | Tam | A61B 6/032 378/17 |
| 5,463,666 A | * | 10/1995 | Eberhard | A61B 6/032 378/4 |

(Continued)

FOREIGN PATENT DOCUMENTS

| WO | WO2014/195068 A1 | 12/2014 |
|---|---|---|
| WO | 2017035217 A1 | 3/2017 |

OTHER PUBLICATIONS

Egan, M.J. "Spiral Growth Manufacture : A Continuous Additive Manufacturing Technology for Powder Processing", Department of Engineering, The University of Liverpool, 2007, 98pgs, (Part 1 of 3).

(Continued)

*Primary Examiner* — Ziaul Karim
(74) *Attorney, Agent, or Firm* — Dority & Manning, P.A.

(57) ABSTRACT

Some embodiments facilitate creation of an industrial asset item via a rotary additive manufacturing process. For example, a build plate may rotate about a vertical axis and move, relative to a print arm, along the vertical axis during printing. An industrial asset item definition data store may contain at least one electronic record defining the industrial asset item. A frame creation computer processor may slice the data defining the industrial asset item to create a series of two-dimensional, locally linear frames helically arranged as a spiral staircase of steps (and each step may be oriented normal to the vertical axis. Indications of the series of two-dimensional frames may then be output to be provided to a rotary three-dimensional printer.

21 Claims, 18 Drawing Sheets

(51) Int. Cl.
- *G06T 17/00* (2006.01)
- *B33Y 30/00* (2015.01)
- *B33Y 50/00* (2015.01)
- *B33Y 10/00* (2015.01)

(52) U.S. Cl.
CPC .............. *B33Y 30/00* (2014.12); *G06T 17/00* (2013.01); *B22F 2003/1056* (2013.01); *B22F 2003/1057* (2013.01); *B33Y 10/00* (2014.12); *B33Y 50/00* (2014.12)

(56) References Cited

U.S. PATENT DOCUMENTS

| | | | |
|---|---|---|---|
| 5,745,197 A * | 4/1998 | Leung | G02B 30/52 349/77 |
| 8,172,562 B2 | 5/2012 | Mattes | |
| 8,944,802 B2 | 2/2015 | Patterson et al. | |
| 9,321,215 B2 | 4/2016 | Dudley | |
| 9,849,631 B1 | 12/2017 | Goss et al. | |
| 2014/0129022 A1 | 5/2014 | Briscella et al. | |
| 2014/0172148 A1 | 6/2014 | Miller | |
| 2014/0191439 A1 | 7/2014 | Davis | |
| 2014/0265034 A1 | 9/2014 | Dudley | |
| 2016/0167303 A1 | 6/2016 | Petelet | |
| 2016/0263832 A1 | 9/2016 | Bui et al. | |
| 2016/0368050 A1 | 12/2016 | Morris et al. | |
| 2017/0050382 A1 | 2/2017 | Minardi et al. | |
| 2017/0151715 A1 | 6/2017 | Voris et al. | |
| 2017/0232680 A1 | 8/2017 | Skogsrud et al. | |
| 2017/0259502 A1 | 9/2017 | Chapiro et al. | |
| 2017/0291841 A1 | 10/2017 | Inamura et al. | |
| 2017/0297106 A1 | 10/2017 | Myerberg et al. | |
| 2018/0085995 A1 * | 3/2018 | Davis | B29C 41/22 |
| 2018/0275636 A1 | 9/2018 | Zhao et al. | |
| 2018/0281282 A1 * | 10/2018 | Elgar | B04C 9/00 |
| 2018/0338196 A1 * | 11/2018 | Freedman | H04R 1/1033 |

OTHER PUBLICATIONS

Egan, M.J. "Spiral Growth Manufacture : A Continuous Additive Manufacturing Technology for Powder Processing", Department of Engineering, The University of Liverpool, 2007, 98pgs, Chapter 3, (Part 2 of 3).

Egan, M.J. "Spiral Growth Manufacture : A Continuous Additive Manufacturing Technology for Powder Processing", Department of Engineering, The University of Liverpool, 2007, 97pgs, Chapter 6, (Part 3 of 3).

Hauser, C. et al., "Spiral Growth Manufacturing (SGM)—A Continuous Additive Manufacturing Technology for Processing Metal Powder by Selective Laser Melting", 2005, pp. 1-12.

International Search Report Corresponding to Application No. PCT/US2018/050559 dated Jan. 10, 2019.

International Search Report Corresponding to Application No. PCT/US2018/060693 dated Feb. 15, 2019.

International Written Opinion Corresponding to Application No. PCT/US2018/060693 dated Feb. 15, 2019.

United States Non Final Office Action Corresponding to U.S. Appl. No. 15/824,206 dated Sep. 13, 2019.

* cited by examiner

| DESIGN IDENTIFIER 1602 | ITEM DESCRIPTION 1604 | FRAME IDENTIFIER 1606 | HEIGHT 1608 | ANGULAR WIDTH 1610 | SCAN PATH 1612 |
|---|---|---|---|---|---|
| D_101 | BRACKET | F_101 | 1 μ | 1.5° | |
| D_101 | BRACKET | F_102 | 1 μ | 1.5° | |
| D_101 | BRACKET | F_103 | 1 μ | 1.5° | |

SCAN PATH GENERATION FOR A ROTARY ADDITIVE MANUFACTURING MACHINE

BACKGROUND

Some embodiments disclosed herein relate to industrial assets and, more particularly, to systems and methods associated with scan path generation for a rotary additive manufacturing machine.

Traditionally, an additive manufacturing process may create parts in a linear fashion. That is, the parts may be sliced into a set of layers at a pre-determined (often equally spaced) heights, each of which may then be built sequentially by moving a laser beam in a pre-designed two-dimensional trajectory (the "scan path").

Creation of an industrial asset item may be facilitated via a "rotary" additive manufacturing process. For example, a build plate may rotate about a vertical axis and move, relative to a print arm, along the vertical axis during printing. That is, the build platform might be lowered with respect to the print arm, the print arm might be raised with respect to the build platform, etc. Two improvements that may be associated with rotary machines as compared to linear counterparts include decreasing (or even eliminating) scanner idle time (increasing throughput as a result) and better space utilization for parts having certain shapes (e.g., a tube).

When the build platform of a rotary machine continuously rotates and drops down simultaneously (a downward spiral motion), however, it may not be feasible to slice the part into horizontal layers as is done for traditional machines. It would therefore be desirable to efficiently and accurately facilitate creation of an industrial asset item via a rotary additive manufacturing process.

SUMMARY

Some embodiments facilitate creation of an industrial asset item via a rotary additive manufacturing process. For example, a build plate may rotate about a vertical axis and move, relative to a print arm, along the vertical axis during printing. An industrial asset item definition data store may contain at least one electronic record defining the industrial asset item. A frame creation computer processor may slice the data defining the industrial asset item to create a series of two-dimensional, locally linear frames helically arranged as a spiral staircase of steps (and each step may be oriented normal to the vertical axis). Indications of the series of two-dimensional frames may then be output to be provided to a rotary three-dimensional printer.

Some embodiments comprise: means for receiving, at a frame creation computer processor from an industrial asset item definition data store, at least one electronic record defining an industrial asset item; means for slicing, by the frame creation computer processor, the data defining the industrial asset item to create a series of two-dimensional, locally linear frames helically arranged as a spiral staircase of steps, wherein the frame creation computer processor incorporates an overlapping frame boundary avoidance technique; and means for outputting indications of the series of two-dimensional frames to be provided to a rotary three-dimensional printer.

Other embodiments comprise: means for receiving, at a frame creation computer processor from an industrial asset item definition data store, at least one electronic record defining the industrial asset item; means for slicing, by the frame creation computer processor, the data defining the industrial asset item to create a series of two-dimensional, locally linear frames helically arranged as a spiral staircase of steps, wherein a first frame in the series has a shape different than a shape of a second frame in the series; and means for outputting indications of the series of two-dimensional frames to be provided to a rotary three-dimensional printer.

Technical effects of some embodiments of the invention are improved and computerized ways to efficiently and accurately facilitate creation of an industrial asset item via a rotary additive manufacturing process. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 16 is a tabular portion of an approximate helical slices database in accordance with some embodiments.

DETAILED DESCRIPTION

Figure 1:
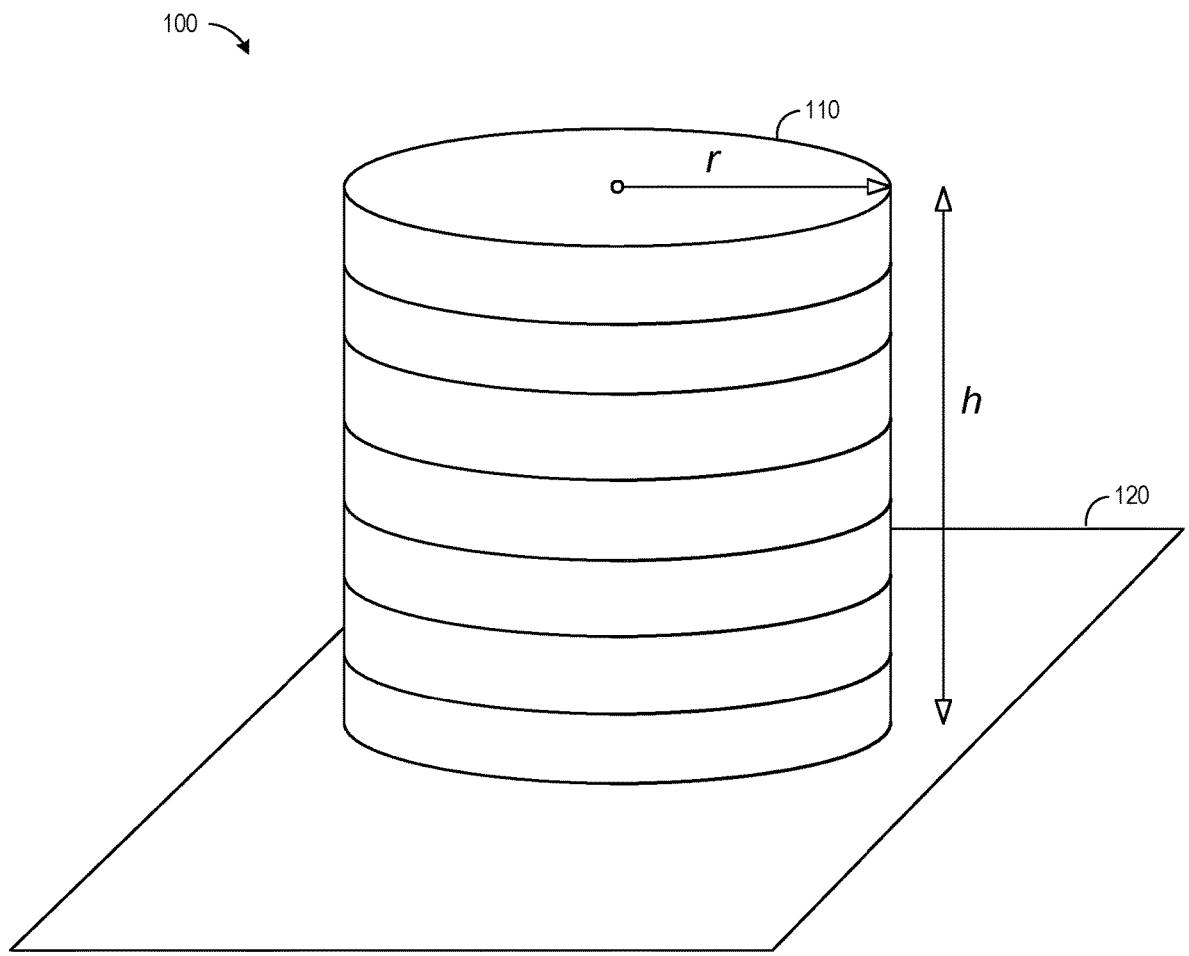
FIG. 1 is an illustration of an industrial asset item traditionally sliced for an additive manufacturing process.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Traditionally, an additive manufacturing process may create parts in a linear fashion. That is, the parts may be sliced into a set of layers at a pre-determined (often equally spaced) heights, each of which may then be built sequentially by moving a laser beam in a pre-designed two-dimensional trajectory (the "scan path").

According to some embodiments, creation of an industrial asset item may be facilitated via a "rotary" additive manufacturing process. For example, a build plate may rotate about a vertical axis and move, relative to a print arm, along the vertical axis during printing. That is, the build platform might be lowered with respect to the print arm, the print arm might be raised with respect to the build platform, etc. Two improvements that may be associated with rotary machines as compared to linear counterparts include decreasing (or even eliminating) scanner idle time (increasing throughput as a result) and better space utilization for parts having certain shapes. When the build platform of a rotary machine continuously rotates and drops down simultaneously (a downward spiral motion), it may not be feasible to slice the part into horizontal layers as is done for traditional machines. According to some embodiments, a part may be created in a continuous helical slice as opposed to building it up from a collection of stacked horizontal slices. An advantage of slicing in this fashion may be that the build substantially continuously without waiting for powder dispense and recoat between layers, and, as a result, laser/scanner utilization (and throughput) may be increased. Some embodiments approximate a helical slice with a collection of locally linear frames that can be built sequentially within practical error tolerances. Although embodiments may be associated with a single laser system, the approaches described herein may be extended to multiple lasers (e.g., by adjusting a downward speed of the platform to increase throughput).

Figure 2:
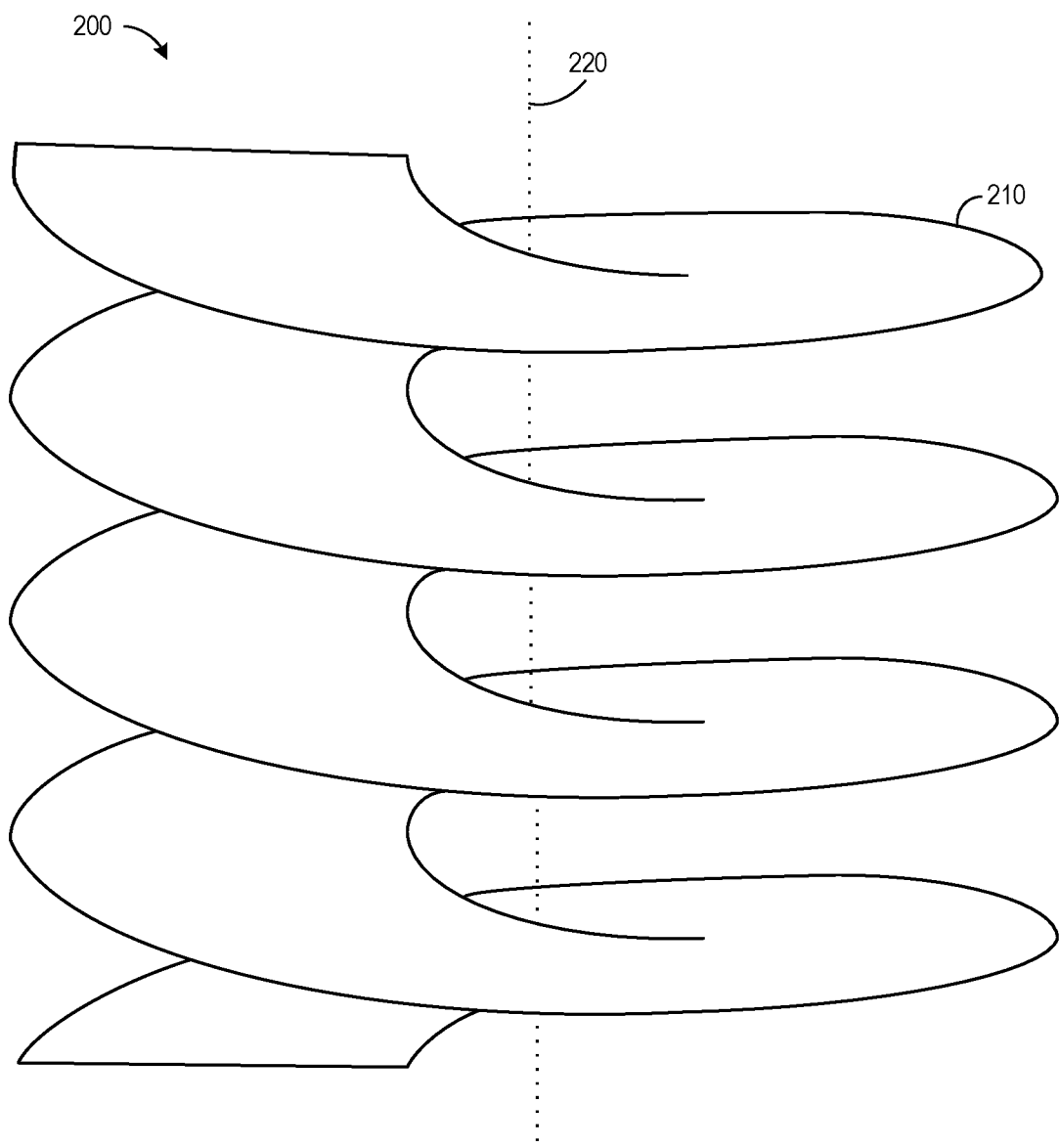
FIG. 2 is an illustration of a helical slice for a single-laser rotary additive manufacture process.
Figure 3:
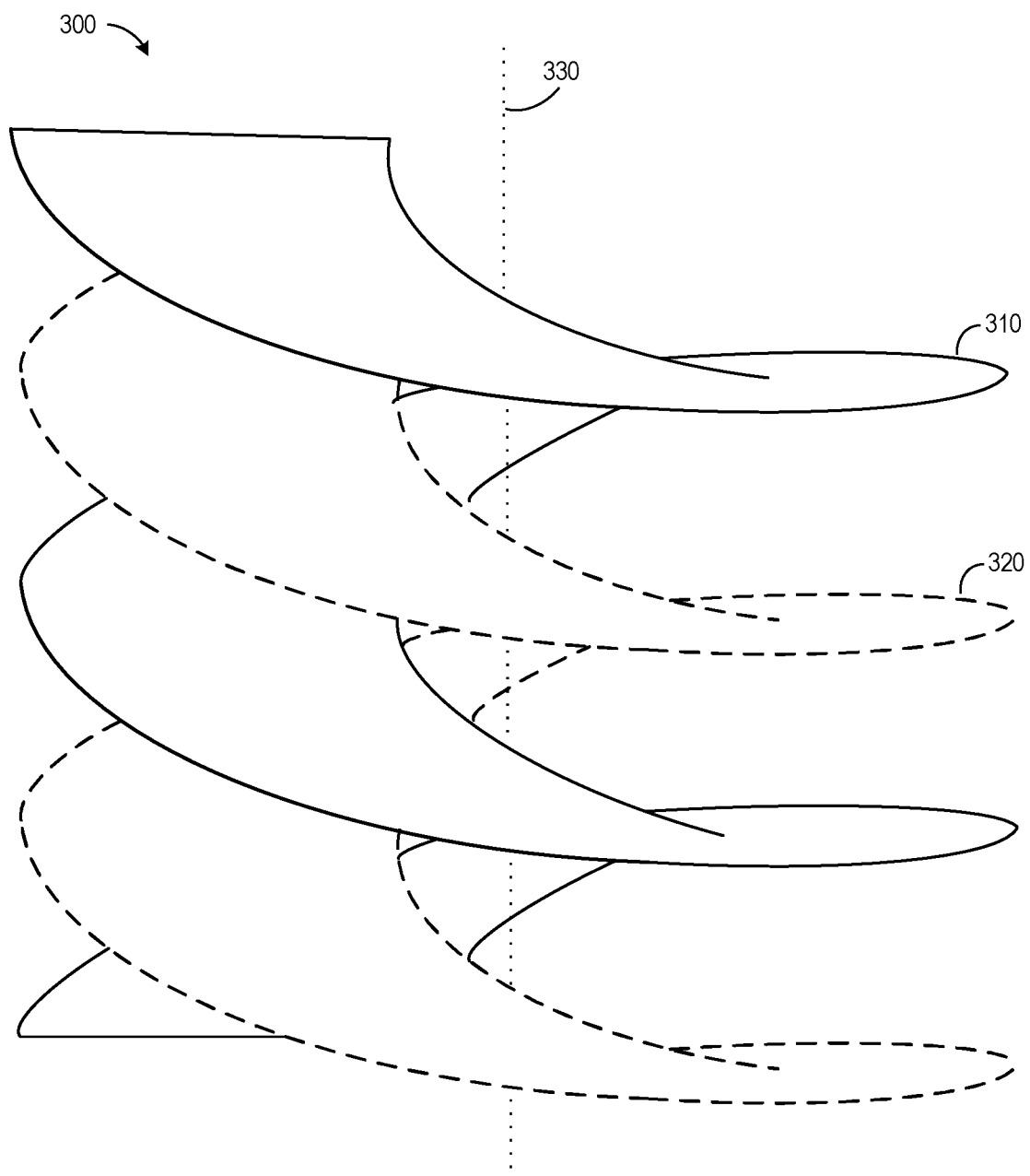
FIG. 3 is an illustration of helical slices for a two-laser rotary additive manufacture process.

FIG. 1 is an illustration 100 of an industrial asset item 110 traditionally sliced for an additive manufacturing process. Traditionally, the item 110, having a radius of r and a height of h, would be sliced into a set of horizontal layers as shown in FIG. 1. The layers would be provided to a three-dimensional printer that could then create the item on a build plate 120. For a rotary machine, however, another approach might be more appropriate. For example, FIG. 2 is an illustration 200 of a helical slice 210 for a single-laser rotary additive manufacture process. The slice 210 might represent, for example, vertical movement of a build plate combined with a simultaneous rotation about an axis 220. Note that the techniques described herein are by no means limited to cylinders, and that any arbitrary shape may be sliced according to embodiments. Moreover, note that embodiments may be associated with systems having more than one print arm or laser. For example, FIG. 3 is an illustration 300 of helical slices 310, 320 for a two-laser rotary additive manufacture process. One slice 310 (illustrated with a solid line in FIG. 3) might be associated with one print arm while the other slice 320 (illustrated with a dashed line in FIG. 3) is associated with the other print arm. The two slices 310, 320 may, according to some embodiments, be intertwined.

Figure 4:
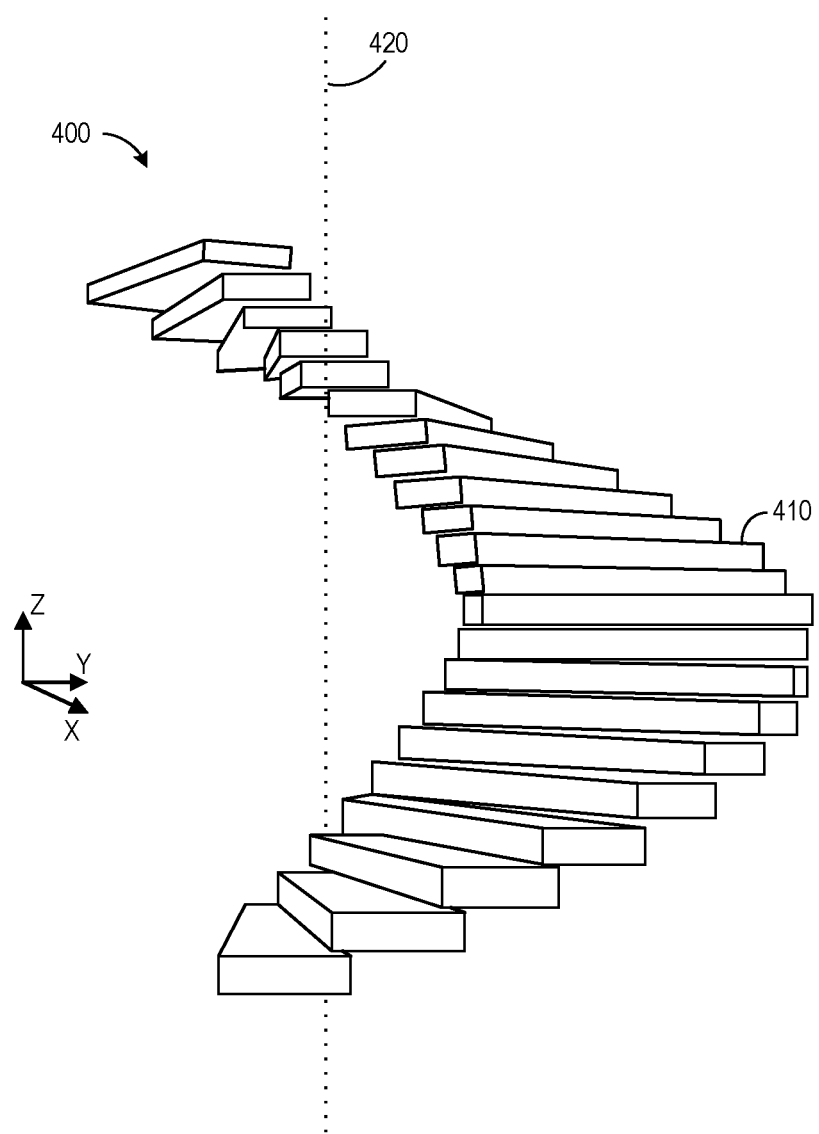
FIG. 4 illustrates a "spiral staircase" approximation of a helical slice for an additive manufacturing process according to some embodiments.

According to some embodiments, the system may slice data defining an industrial asset item to create a series of two-dimensional, locally linear frames helically arranged as a "spiral staircase" of steps. For example, FIG. 4 illustrates a "spiral staircase" 400 approximation of a helical slice for an additive manufacturing process according to some embodiments. The staircase 400 is comprised of a series of two-dimensional steps 410, with each step being oriented normal to a vertical axis 420 (in the "Z" direction). Note that the staircase is two-dimensional slicing and scanning strategy (as opposed to a three-dimensional approach). Note that as used herein, the phrase "spiral staircase" might refer to a series of frames that include at least some overlapping neighboring frames and/or at least some frames having a gap or space between a neighboring frame. Moreover, embodiments might be associated with frames with different radial dimensions, frames having "radial edges" that are not actually radial, frames having "circumferential edges" that are not actually circumferential," etc. Moreover, embodiments may be associated with a spiral staircase including both: (i) a series of inner frames or steps, and (ii) a series of outer frames or steps each at the same Z position as a corresponding inner step. The inner and outer steps might represent stair step in two more pieces (which might be divided arbitrarily).

Figure 5:
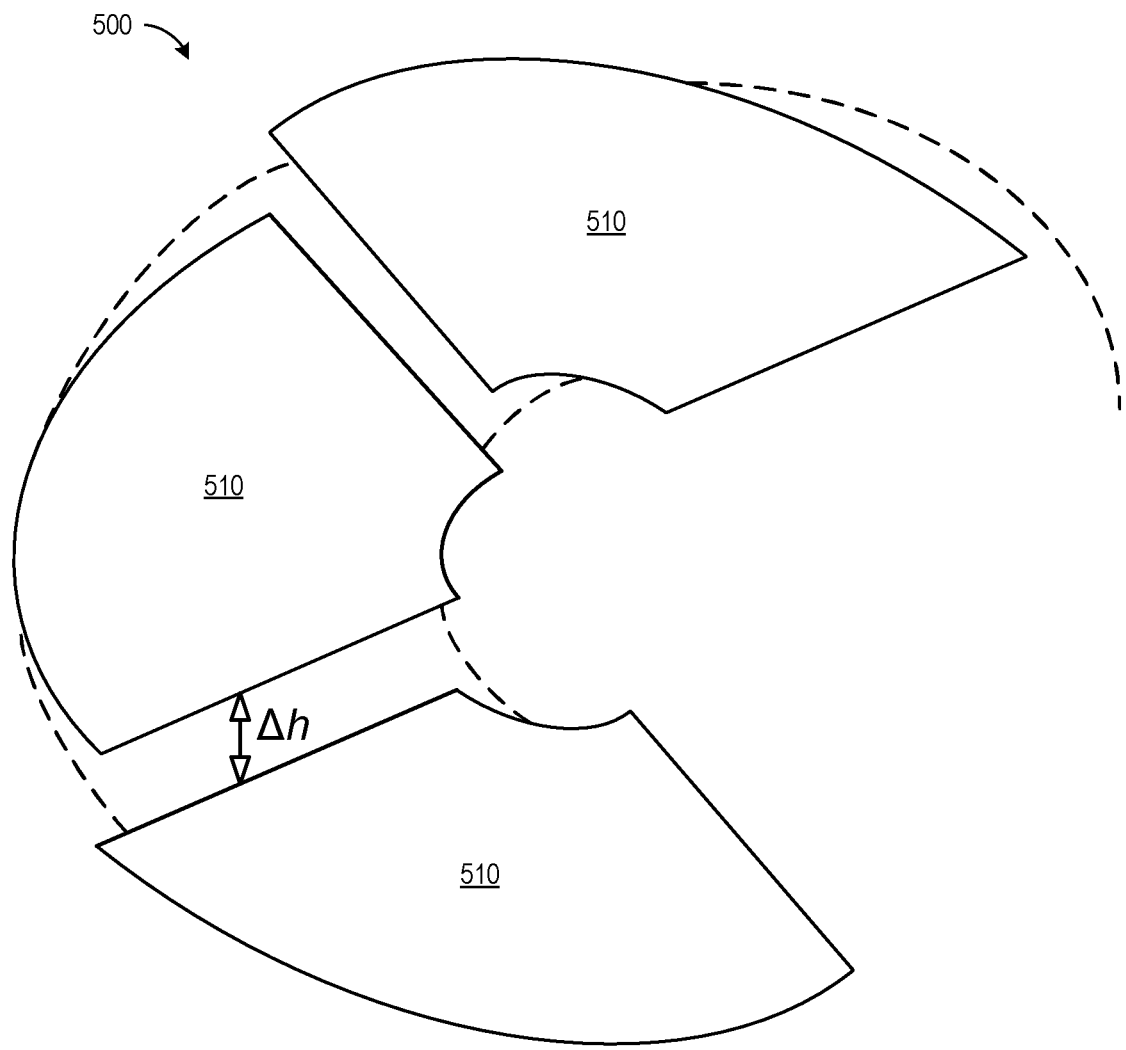
FIG. 5 is an example of frames approximating slices of a helical surface in accordance with some embodiments.

The helical slice may be sub-divided into a collection of overlapping steps 410 or frames. According to some embodiments, the helical slice may be approximated by a collection of overlapping frames 410 each of which is oriented normally to the axis of the cylinder. According to some embodiments, each step 410 or frame is scanned sequentially. Moreover, as illustrated 500 in FIG. 5, each frame 510 might be associated with a particular height Δh. Note that for a uniform section of the geometry in the z direction (vertical), the system may increase stair step height to reduce computational cost. This might be possible, for example, when the geometry contained within the frames will not change significantly. Consider, for example, a hollow cylinder. The geometry contained within the frames may be exactly identical. In this case, the system may just generate the scan path for the first frame and repeat it until it is determined that a hatch angle should be adjusted. Even at that point, the system does not need to compute the geometric boundary contained within the frame. This represents increasing the step height with a much wider horizontal section.

Figure 6A:
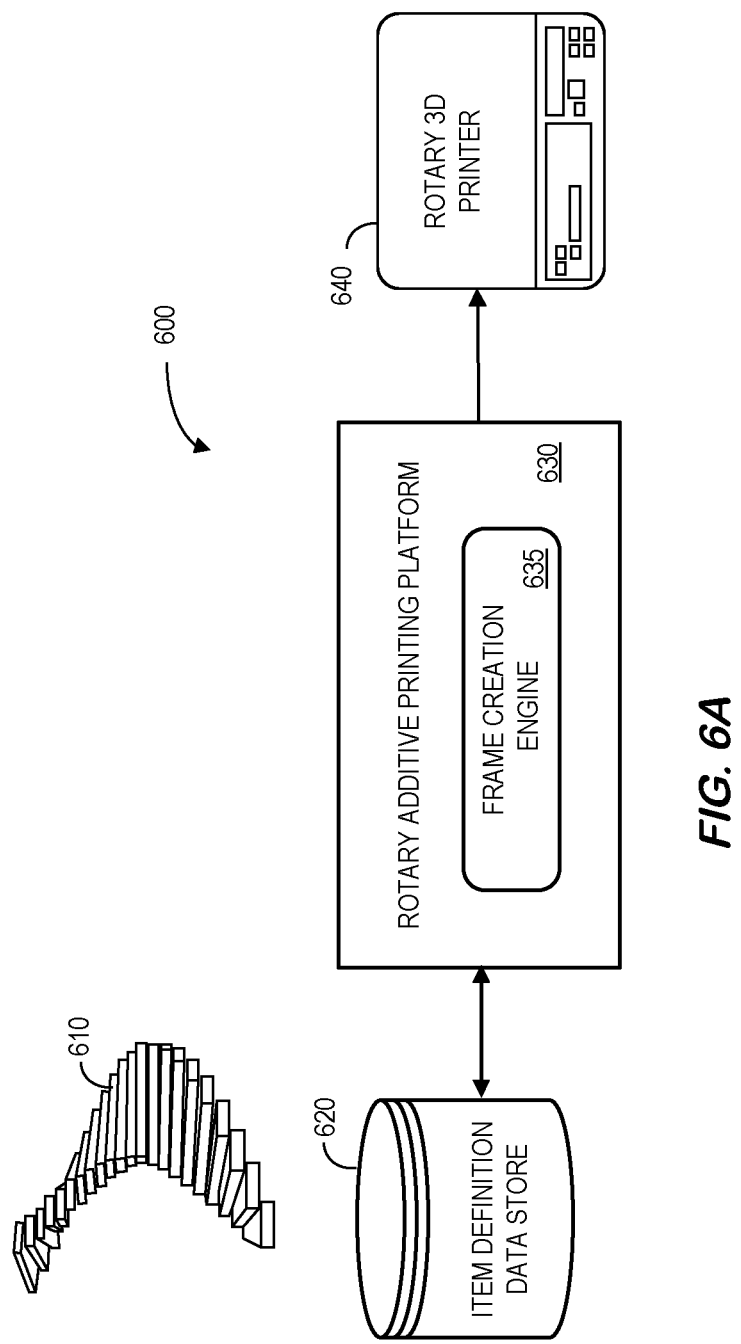
FIG. 6A is a high-level diagram of a system according to some embodiments.

The frames 510 may then be sent to a three-dimensional printer to create an industrial asset item. FIG. 6A is a high-level diagram of a system 600 according to some embodiments. The system includes a rotary additive printing platform 630 that executes a frame creation engine 635. According to some embodiments, the rotary additive printing platform 630 can access an item definition data store 620 that includes electronic records defining an industrial asset item (e.g., Computer Aided Design ("CAD") files). Note that the rotary additive printing platform 630 could be completely de-centralized and/or might be associated with a third party, such as a vendor that performs a service for an enterprise.

The rotary additive printing platform 630 and/or other elements of the system might be, for example, associated with a Personal Computer ("PC"), laptop computer, a tablet computer, a smartphone, an enterprise server, a server farm, and/or a database or similar storage devices. According to some embodiments, an "automated" rotary additive printing platform 630 may automatically create frames 610 associated with the industrial asset item that may be stored (e.g., in the item definition data store 620) and/or provided to a three-dimensional printer 640. As used herein, the term "automated" may refer to, for example, actions that can be performed with little (or no) intervention by a human.

As used herein, devices, including those associated with the rotary additive printing platform 630 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The rotary additive printing platform 630 may store information into and/or retrieve information from data stores, including the item definition data store 620. The data stores might, for example, store electronic records representing prior item designs, three-dimensional printer information, etc. The data stores may be locally stored or reside remote from the rotary additive printing platform 630. Although a single rotary additive printing platform 630 is shown in FIG. 6, any number of such devices may be included. Moreover, various devices described herein might be combined according to embodiments of the present invention. For example, in some embodiments, the rotary additive printing platform 630, item definition data store 620, and/or other devices might be co-located and/or may comprise a single apparatus.

Figure 6B:
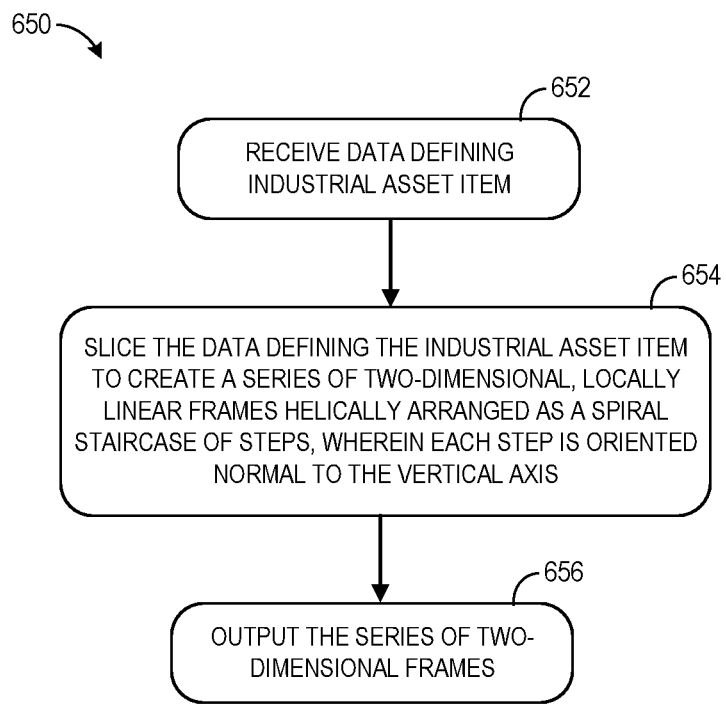
FIG. 6B is a method that may be associated with a rotary additive manufacturing system in accordance with some embodiments.

Note that the system 600 of FIG. 6 is provided only as an example, and embodiments may be associated with additional elements or components. According to some embodiments, the elements of the system 600 automatically facilitate creation of an industrial asset item via a rotary additive manufacturing process. For example, FIG. 6B illustrates a method 650 that might be performed according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

Note that the method of FIG. 6B may facilitate creation of an industrial asset item via a rotary additive manufacturing process. For example, a build plate may rotate about a vertical axis and move, relative to a print arm, along the vertical axis during printing. At 652, the system may receive data defining the industrial asset item. For example, the information might be received from an industrial asset item definition data store containing at least one electronic record defining the industrial asset item. The at least one electronic record defining the industrial asset item might be associated with, for example, an image, a manufactured design, a cross-section, a binary CAD file, a geometry file, etc.

At 654, the system may slice the data defining the industrial asset item to create a series of two-dimensional, locally linear frames helically arranged as a spiral staircase of steps. As illustrated in FIG. 4, each step may be oriented normal to the vertical axis.

At 656, the system may output (e.g., store or transmit) indications of the series of two-dimensional frames to be provided to a rotary three-dimensional printer to create the industrial asset item. The rotary three-dimensional printer may be, for example, associated with a Direct Metal Laser Melting ("DMLM") process. According to some embodiments, the three-dimensional printer has a single print arm. According to other embodiments, the printer has two or more print arms and the system creates a first series of two-dimensional frames associated with one print arm and a second series of two-dimensional frames associated with the other print arm (and the first and second series may be arranged as intertwined spiral staircases). Note that the rotational speed may remain the same but vertical travel speed may increase contributing to increased throughput. According to still other embodiments, the three-dimensional printer has two or more print arms and one print arm processes one frame in the series simultaneously as another print arm processes another frame in the series. Note that the frames may be assigned to a print arm in a pre-defined schedule or a dynamically created schedule. That is, multiple lasers may work on different segments (predefined or dynamically scheduled) of the same helix or spiral staircase. Different segments are may be particularly easy to identify if the item being printed has geometric segments. For example, one laser might work on an inner liner of a tube while another laser works on an outer liner. In this embodiment, rotational speed may be increased increase throughput.

Figure 7:
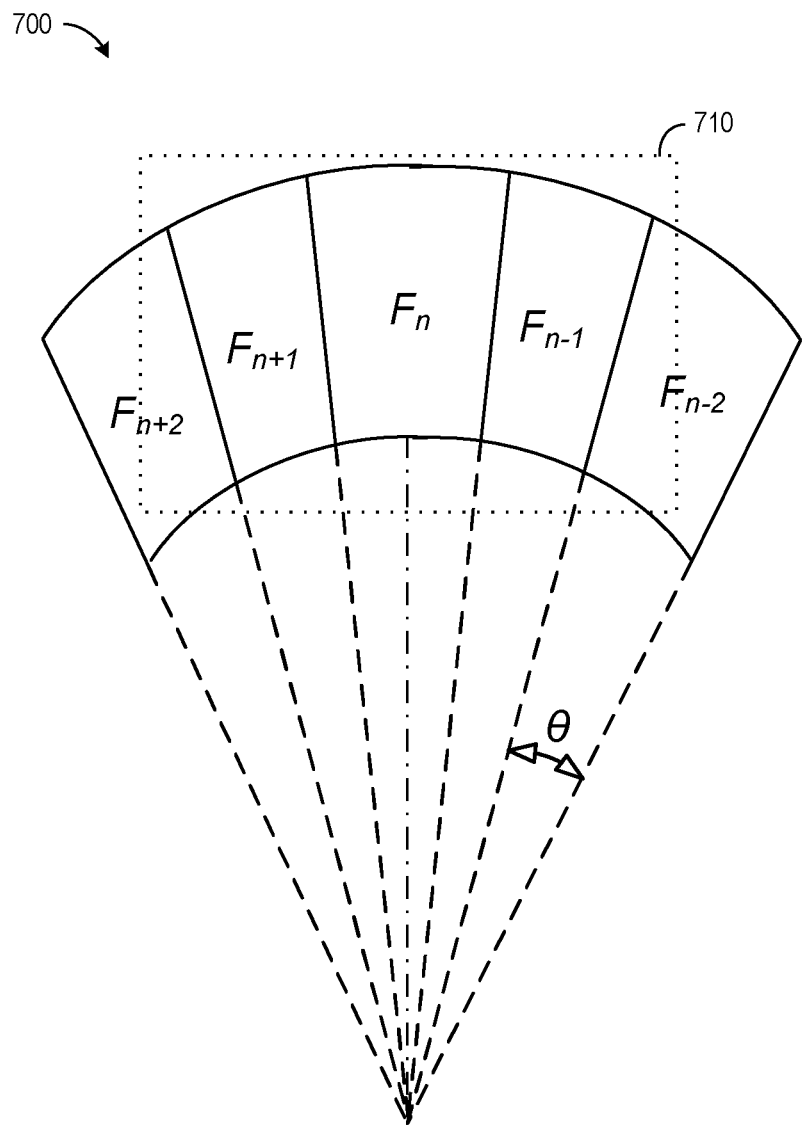
FIG. 7 is an example of a relationship between a scan field and frames of a helical slice according to some embodiments.

As used herein, the term "frame" may refer to, for example, a geometry contained within a sector of angle $\theta$ as shown in FIG. 7. As illustrated 700, frame $F_n$ is currently being scanned, frame $F_{n-1}$ has already been scanned, and frame $F_{n+1}$ is next in line to be scanned. According to some embodiments, the frames are chosen so as to occupy only a fraction fr (e.g., 0.2 to 0.3) of a working scan field 710 of the scanning system (illustrated by a dotted box in FIG. 7) to help ensure that the frame being scanned is always within the scan field 710. According to some embodiments, a rotational velocity $\omega$ is adjusted so that the wait time between scanning of frames may be minimized (that is, the wait time indicates $\omega$ can be increased) and the frames do not "walk away" from the scan field 710 (which indicates $\omega$ needs to be decreased). According to some embodiments, $\omega$ is adjusted on the fly to minimize wait (and thus maximize throughput) and avoid gaps in the scan. Note that the phrase "wait time" may refer to, for example, a time during which the laser is idle. The build platform continuously rotates and moves down (or the print arm moves up).

Figure 8:
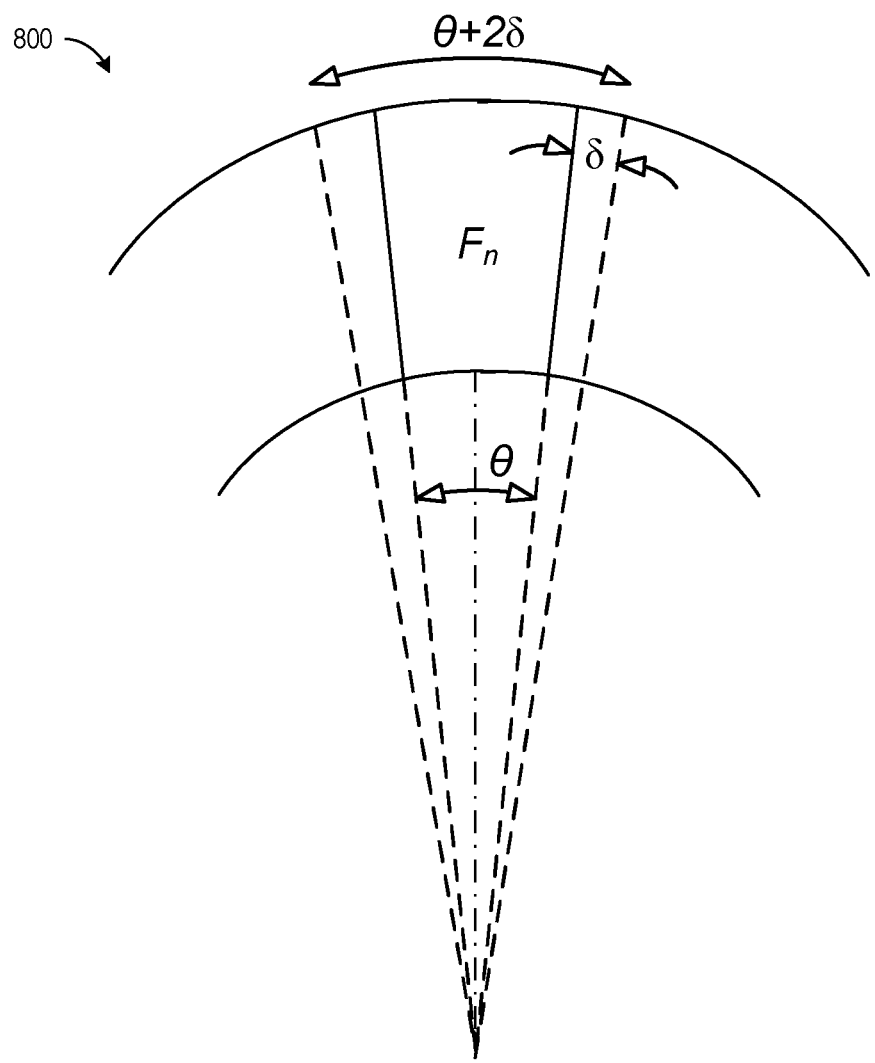
FIG. 8 illustrates the generation of frames from a linear slice in accordance with some embodiments.

FIG. 8 illustrates 800 the generation of frames from a linear slice in accordance with some embodiments. In particular, frame $F_n$ has an angular width of $\theta$. Note that software tools and algorithms may exist to do linear slicing. According to some embodiments, such tools may be adapted to support helical slicing. For example, frames may be derived from a linear slicing tool to leverage the existing machinery as follows. Once the system has decided on a $\Delta h$, it can slice the geometry at a layer thickness $\Delta h$. The frame $F_i$ may then then be extracted from the layer $L_i$ by having an intersection operation with a mask $M_i$ as $F_i = L_i \cap M_i$. The mask $M_i$ may be derived, according to some embodiments, by offsetting the center and increasing the sector angle θ by a small amount to ensure overlap between successive frames. In FIG. 8, the solid lines bound the actual frame Fn while the dotted lines (increased by δ on both sides for an overall width of θ+2δ) represent the corresponding mask. Note that if kΔh<ε, where k is an integer, then then the system may slice at layer height kΔh and extract k frames from each layer. Note that this method can be extended for n lasers as the system only needs to speed up the z motion of the build plate n-fold.

Figure 9:
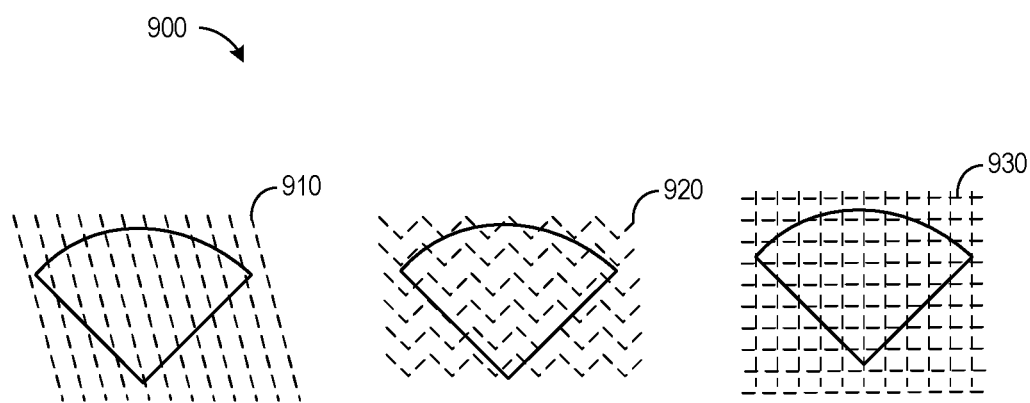
FIG. 9 includes different examples of scan patterns according to some embodiments.

Once the frames are extracted, they can be scanned with various scan patterns as appropriate for a particular application. FIG. 9 includes 900 different examples 910, 920, 930 of scan patterns according to some embodiments. Another approach may be to collapse the helical surface into a plane, generate the frames on the resulting self-overlapping planar surface and apply commercial tools to those segments. The system may then translate the scan paths generated within these frames to the axial position so that they approximate the original helical surface. Still another approach may be to create scan paths along the entirety of a collapsed helical surface, and then translate or project those paths back onto the original three-dimensional helix. Note that the masking method described herein to extract frames from a linear slicing or flattened helix might also be applied to an already generated linear scan path or set of paths. In that case, the system may compensate for the fact that it is trying to achieve a trajectory intended for a stationary frame in a rotating frame. According to some embodiments, a scanner's marking/processing on the fly methods may be adapted to achieve this compensation.

Figure 10:
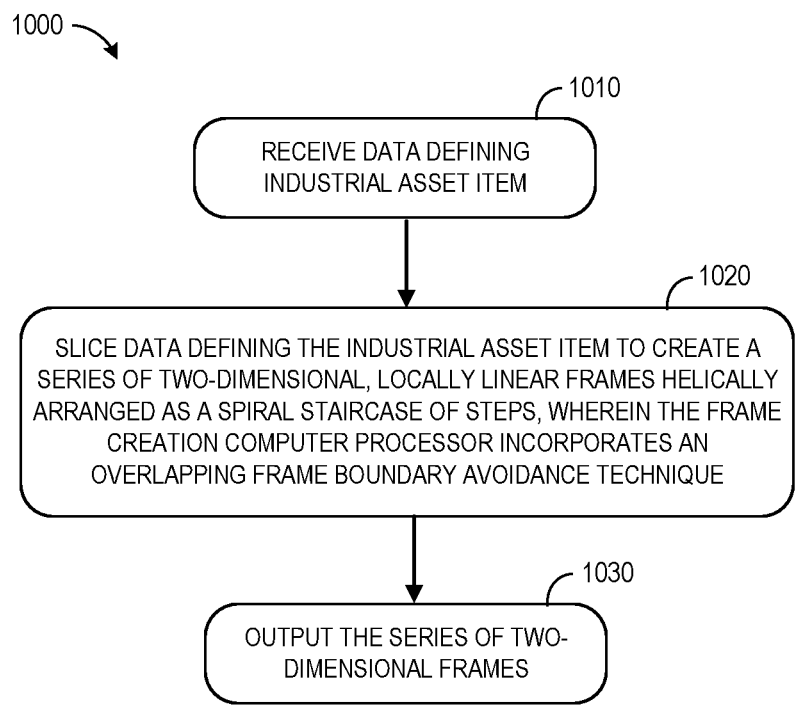
FIG. 10 is a method of reducing alignment zipper faults in accordance with some embodiments.

FIG. 10 is a method 1000 of reducing alignment zipper faults in accordance with some embodiments. At 1010, the system may receive data defining the industrial asset item. At 1020, the system may slice the data defining the industrial asset item to create a series of two-dimensional, locally linear frames helically arranged as a spiral staircase of steps. According to this embodiment, a frame creation computer processor incorporates an overlapping frame boundary avoidance technique when creating the series of frames. At 1030, the system may output (e.g., store or transmit) indications of the series of two-dimensional frames to be provided to a rotary three-dimensional printer to create the industrial asset item.

Several different overlapping frame boundary avoidance techniques might be implemented. For example, when a planar frame approximation to a helical surface is used, the difference in z height between the left edge and the right edge of a frame (Δh) may need to be within some tolerance ε. Also, if θ is chosen to be a factor of 360°, then the seams of the frames may line up causing a "zipper" fault in the build. One approach to avoid that would be to set $$\theta = \frac{360}{m},$$

where m is an irrational or prime number. If m is irrational, the seams will never (theoretically) line up, whereas when m is a prime number, the seams will line up at a thickness equal to m times the layer thickness of an equivalent linear slice. If the intended layer thickness of an equivalent linear slice is t, then Δh=t/m<ε. By way of example only, for a typical parameter set, Δh might be approximately 1μ. According to some embodiments, m may be selected to a be a non-integer.

Figure 11A:
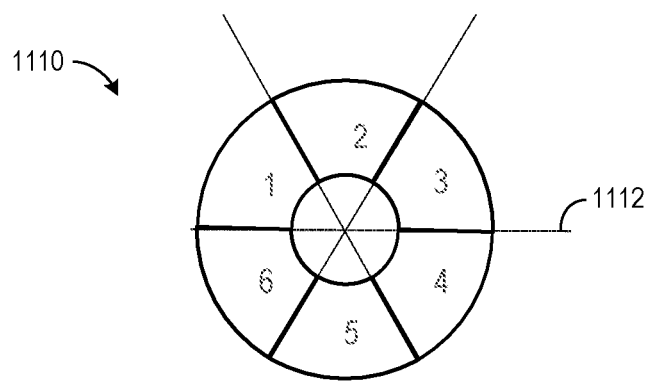
FIGS. 11A through 11C illustrate various sector widths as compared to stage resolution in accordance with various embodiments.
Figure 11B:
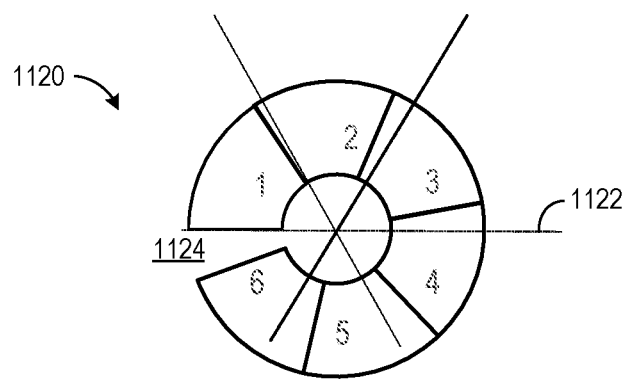
Figure 11C:
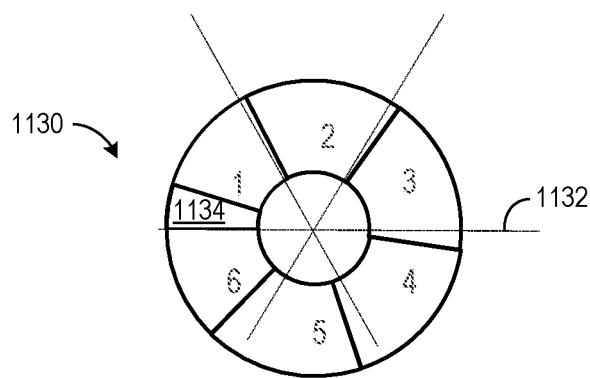
Figure 12:
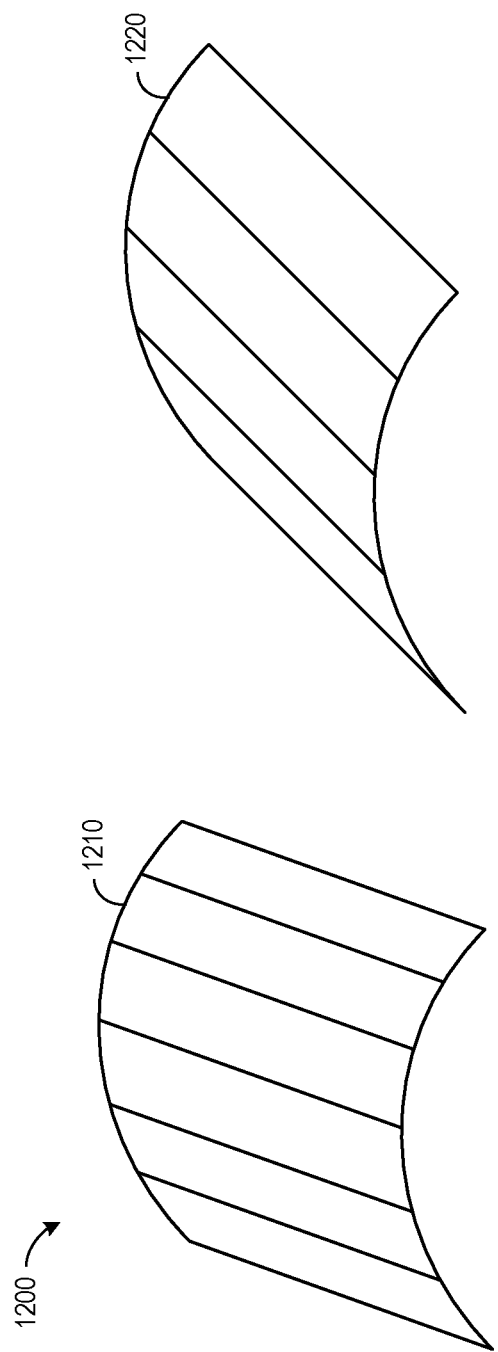
FIG. 12 illustrates various hatch angles in accordance with some embodiments.

Note that this situation may rarely arise if the system make the sector angle variable from frame to frame as described with respect to FIGS. 11 and 12. Although some embodiments are described with respect to overlapping frame boundary avoidance techniques, note that embodiments might also allow for overlapping frame boundaries (if desired). That is, a technique may be applied to ensure that an overlapping frame boundary exists.

According to some embodiment, a sector width for a rotary part may comprise a whole number multiple of a rotary stage position resolution. This is because if the width of a sector is not an integer multiple of the rotary stage position resolution, a part may be printed distorted due to rounding. For example, FIGS. 11A through 11C illustrate various sector widths as compared to stage resolution in accordance with various embodiments. In particular, FIG. 11A illustrates a desirable situation 1110 where sector width (of actual sectors 1 through 6) is an integer multiple of stage resolution 1112 and, as a result, sectors do not process or recess around the circle. FIG. 11B illustrates an undesirable situation 1120 where sector width (of actual sectors 1 through 6) is less than an integer multiple of stage resolution 1122 (e.g., rounds down 1 count per sector). As a result, the sectors recess around the circle and there is a gap 1124 such that process does not form a complete circle. FIG. 11C illustrates an undesirable situation 1130 where sector width (of actual sectors 1 through 6) is greater than an integer multiple of stage resolution 1132 (e.g., rounds up 1 count per sector). As a result, the sectors process around the circle and there is an overlap 1134.

The hatch angle is defined as the angle between the scan line and the centerline of the frame (that is, the line that connects the origin of the scan field to the center of rotation). In traditional DMLM, the hatch angle is changed from layer to layer to avoid defect stack ups in vertical direction. According to some embodiments, the system may change the hatch angle from revolution to revolution. For example, the system may change the hatch angle after the frame that is closest to one revolution. According to another embodiment, the system may subdivide the hatch angle increment among frames within a single revolution. For example, if the intended hatch angle rotation is 60° per revolution and each revolution has 30 equal spaced frames, then the system might increment the hatch angle by 2° degree for each frame to have a more uniform change gradient. Note that in some embodiments, hatches might be created ahead of time before the printing process is initiated. According to other embodiments, hatches might instead be created directly by a print machine processor as the item is being printed.

According to some embodiments, all of the frames created for an industrial asset item are of same shape. According to other embodiments, different frames in a series may have different shapes. For example, FIG. 12 illustrates 1200 various hatch angles 1210, 1220 in accordance with some embodiments. In particular, the shape of the frames varies based on the changes to the hatch angle. Note that the frames might cover the same area despite their shape difference. Making the frame shape dependent on hatch angle may help minimize the number of overlapping seams between two adjacent frames when hatch lines crosses frame boundaries. According to some embodiments, the area of frames varies based on the area of the geometry contained within them. The sector angle (angle that the inner arc produces at the center of rotation) might thus be varied to make sure the area of geometry contained in each frame remains substantially equal.

Figure 13:
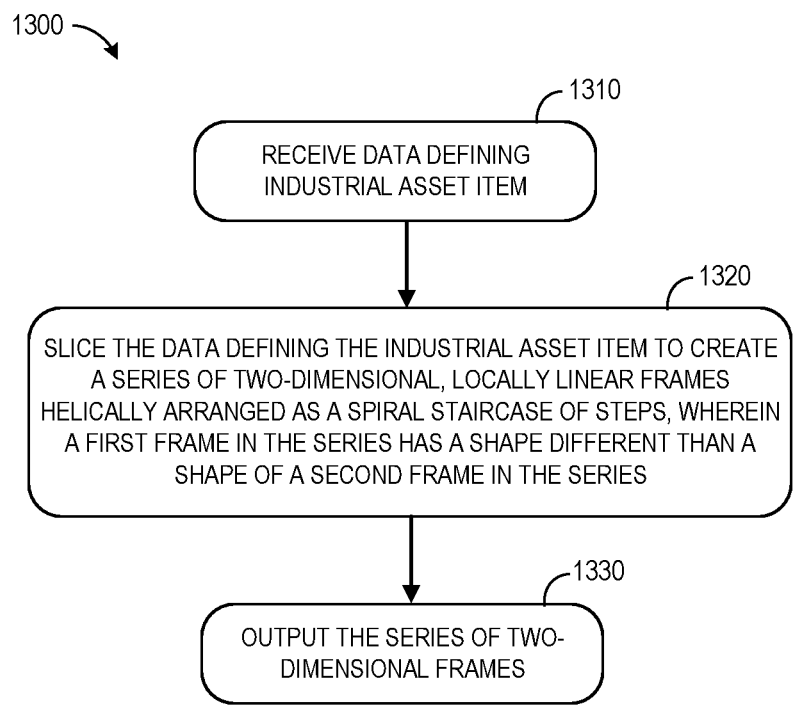
FIG. 13 is a method of adjusting frame shapes according to some embodiments.

FIG. 13 is a method 1300 of adjusting frame shapes according to some embodiments. At 1310, the system may receive data defining the industrial asset item. At 1320, the system may slice the data defining the industrial asset item to create a series of two-dimensional, locally linear frames helically arranged as a spiral staircase of steps. According to this embodiment, a first frame in the series has a shape different than a shape of a second frame in the series. At 1330, the system may output (e.g., store or transmit) indications of the series of two-dimensional frames to be provided to a rotary three-dimensional printer to create the industrial asset item. According to some embodiments, a first frame in the series has a width different than a width of a second frame in the series. According to other embodiments, a first frame in the series has vertical height different than a vertical height of a second frame in the series.

Figure 14:
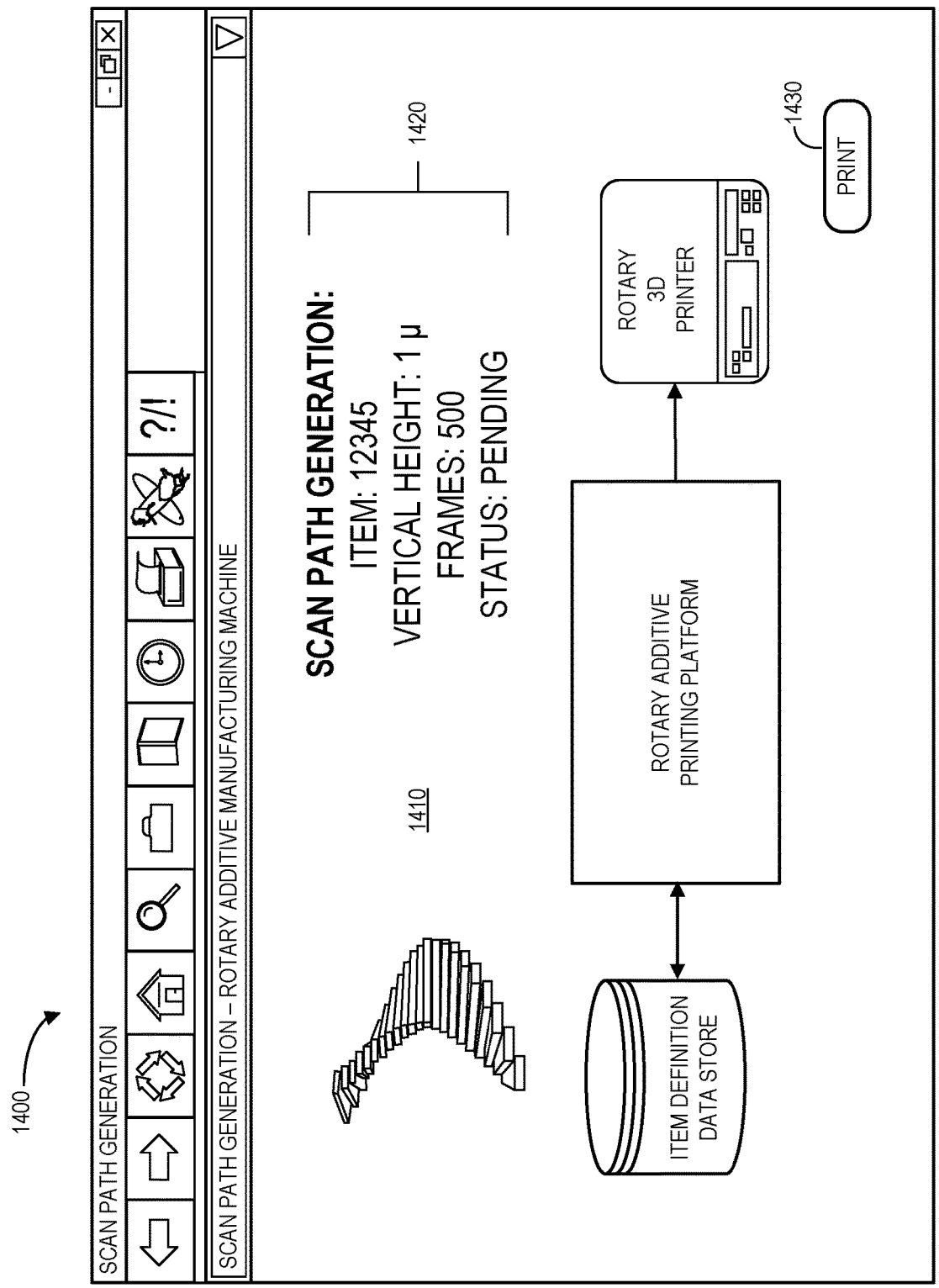
FIG. 14 illustrates a display in accordance with some embodiments.

FIG. 14 illustrates a display 1400 in accordance with some embodiments. The display 1400 may include an interactive user interface 1410 that graphically displays the status of various elements in a scan path generation system. According to some embodiments, selection of one or more elements in the display 1400 may result in the appearance of more detailed information about the system, allow an operator to make parameter adjustments, etc. According to some embodiments, selection of an icon 1430 (e.g. via a computer mouse) may initiating a scan generation process, a printing operation, etc.

Figure 15:
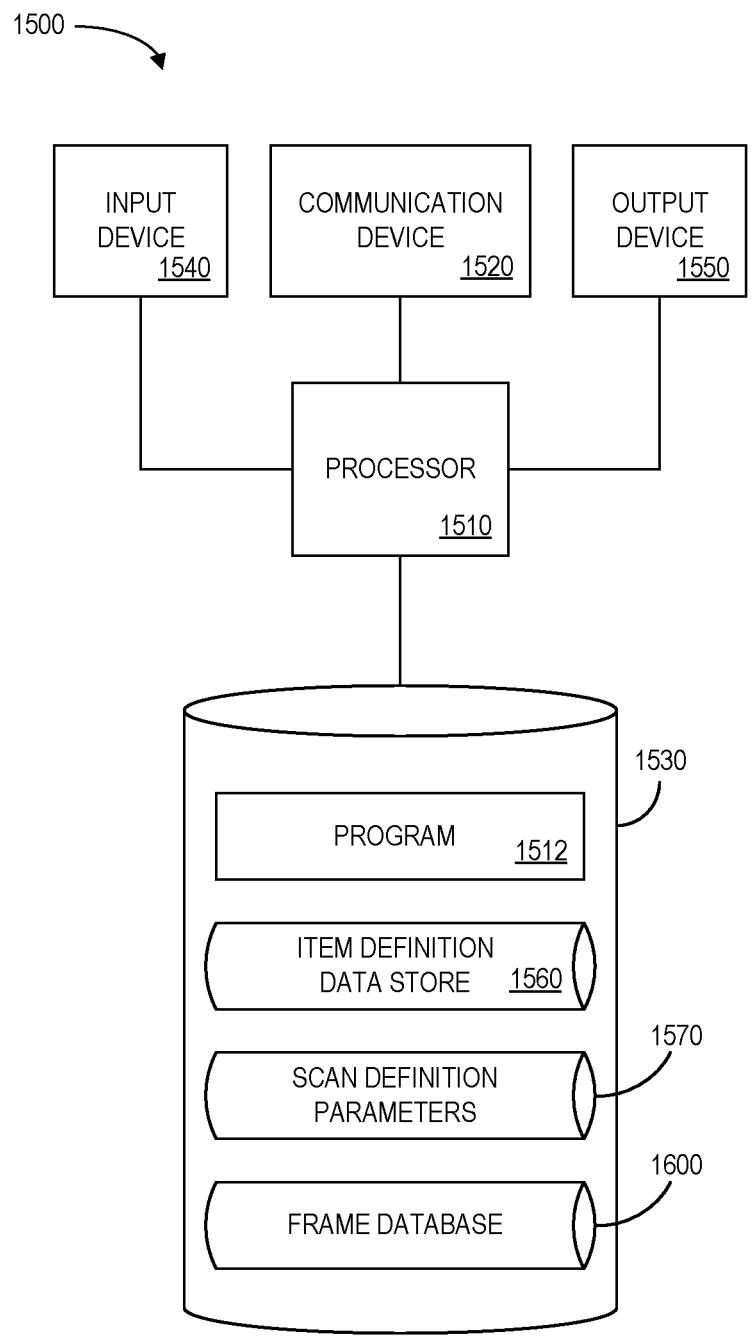
FIG. 15 illustrates a platform according to some embodiments.

Embodiments described herein may comprise a tool that facilitates creation of an industrial asset item via a rotary additive manufacturing process and may be implemented using any number of different hardware configurations. For example, FIG. 15 illustrates a platform 1500 that may be, for example, associated with the system 600 of FIG. 6A (as well as other systems described herein). The platform 1500 comprises a processor 1410, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote expert devices. Note that communications exchanged via the communication device 1520 may utilize security features, such as those between a public internet user and an internal network of an insurance enterprise. The security features might be associated with, for example, web servers, firewalls, and/or PCI infrastructure. The platform 1500 further includes an input device 1540 (e.g., a mouse and/or keyboard to enter information about a design file, an industrial asset item, etc.) and an output device 1550 (e.g., to output design reports, generate production status messages, etc.).

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1512 and/or network security service tool or application for controlling the processor 1510. The processor 1510 performs instructions of the program 1512, and thereby operates in accordance with any of the embodiments described herein. For example, the processor 1510 may facilitate creation of an industrial asset item via a rotary additive manufacturing process. An industrial asset item definition data store may contain at least one electronic record defining the industrial asset item. The processor 1510 may then slice the data defining the industrial asset item to create a series of two-dimensional, locally linear frames helically arranged as a spiral staircase of steps (and each step may be oriented normal to the vertical axis. Indications of the series of two-dimensional frames may then be output by the processor 1510 to be provided to a rotary three-dimensional printer The program 1512 may be stored in a compressed, uncompiled and/or encrypted format. The program 1512 may furthermore include other program elements, such as an operating system, a database management system, and/or device drivers used by the processor 1510 to interface with peripheral devices.

As used herein, information may be "received" by or "transmitted" to, for example: (i) the platform 1500 from another device; or (ii) a software application or module within the platform 1500 from another software application, module, or any other source.

In some embodiments (such as shown in FIG. 15), the storage device 1530 further stores an industrial asset item definition data store 1560, scan definition parameters 1570 (e.g., operator preferences, printer capabilities, etc.), and a frame database 1600. An example of a database that might be used in connection with the platform 1500 will now be described in detail with respect to FIG. 16. Note that the database described herein is only an example, and additional and/or different information may be stored therein. Moreover, various databases might be split or combined in accordance with any of the embodiments described herein. For example, the item definition data store 1560 and/or frame database 1600 might be combined and/or linked to each other within the program 1512.

Referring to FIG. 16, a table is shown that represents the frame database 1600 that may be stored at the platform 1500 in accordance with some embodiments. The table may include, for example, entries identifying designs that have been created for industrial asset items. The table may also define fields 1602, 1604, 1606, 1608, 1610, 1612 for each of the entries. The fields 1602, 1604, 1606, 1608, 1610, 1612 may, according to some embodiments, specify: a design identifier 1602, an item description 1604, a frame identifier 1606, a height 1608, an angular width 1610, and a scan pattern 1612. The frame database 1600 may be created and updated, for example, based on information electrically received from an operator, a rotary additive printing platform, a frame creation engine, etc.

The design identifier 1602 may be, for example, a unique alphanumeric code identifying an industrial asset as indicated by the item description 1604. The frame identifier 1606 may identify each of a series of frames that comprise a spiral staircase representation of the item. The height 1608 might represent a vertical or z height of each step in the staircase and the angular width 1610 might define the area associated with the frame. The scan pattern 1612 might define how the print arm or laser should be moved during printing (e.g., including hatch angles, part geometries, etc.).

Thus, some embodiments described herein may provide technical advantages, including a continuously rotating machine that improves throughput by minimizing scanner idle time (in the ideal case) while also improving machine space utilization for certain classes of part geometries. Combining multiple scan heads also becomes relatively easier from a scan path generation point of view as compared to a cartesian machine. Approximating the helical surface with a series of planar frames in two dimensions may also allow existing scan path generation toolchains to work in connection with a helical surface. Embodiments provide system and methods to generate a scan path to build a part additively on a continuously rotating machine. Moreover, some embodiments leverage the existing linear slicing algorithms and software to achieve these goals.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 17:
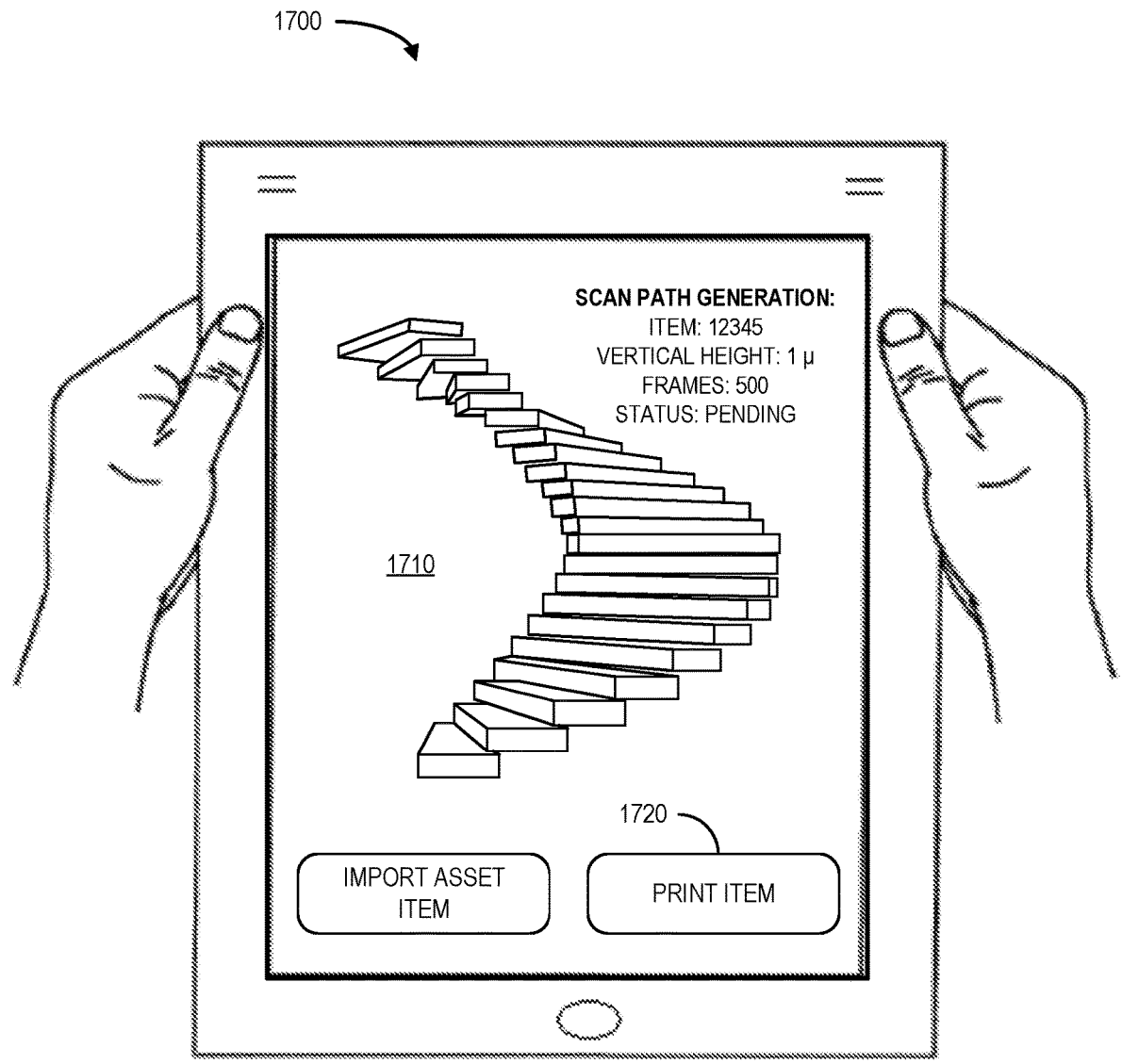
FIG. 17 illustrates a tablet computer providing a display according to some embodiments.

Although specific hardware and data configurations have been described herein, note that any number of other configurations may be provided in accordance with embodiments of the present invention (e.g., some of the information described herein may be combined or stored in external systems). Moreover, although embodiments have been described with respect to industrial systems, note that embodiments might be associated with other types of computing systems, including non-industrial systems, consumer items, etc. Similarly, the displays shown and described herein are provided only as examples, and other types of displays and display devices may support any of the embodiments. For example, FIG. 17 illustrates a tablet computer 1700 with a scan path generation design display 1710 that might utilize a graphical user interface. The display 1710 might include a depiction of a series of frames that have been automatically generated for an industrial asset item. Note that selection of an element on the display 1710 might result in a display of further information about that element. Moreover, the display 1710 might comprise an interactive user interface (e.g., via a touchscreen) and includes "import asset item" and "print item" 1720 icons in accordance with any of the embodiments described herein.

Some embodiments have been described with respect to the creation of an "industrial asset item," which might be, for example, an engine part, a generator component, etc. Note, however, that as used herein the phrase "industrial asset item" might refer to any other type of item, including: consumer electronics parts, toys, household goods, automotive parts, etc. In general, embodiments may address the challenges creating scan paths for rotary additive manufacturing machines.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate creation of an industrial asset item via a rotary additive manufacturing process wherein a build plate rotates about a vertical axis and moves, relative to a print arm, along the vertical axis during printing, comprising:
   an industrial asset item definition data store containing at least one electronic record defining the industrial asset item; and
   a frame creation platform, coupled to the industrial asset item definition data store, including:
   a communication port to receive data defining the industrial asset item, and
   a frame creation computer processor coupled to the communication port and adapted to:
      slice the data defining the industrial asset item to create a series of two-dimensional frames helically arranged as a spiral staircase of steps, wherein each step is oriented normal to the vertical axis, wherein a hatch angle associated with a frame of one revolution of the build plate and defined between a centerline of the frame and a scan line is different than the hatch angle associated with a frame of another revolution of the build plate, and wherein the hatch angle is incremented within frames of a single revolution of the build frame, and
      output the sliced data indicative of the series of two-dimensional frames to be communicated to a rotary three-dimensional printer.

2. The system of claim 1, wherein the three-dimensional printer has two or more print arms and said frame creation computer creates a first series of two-dimensional frames associated with one print arm and a second series of two-dimensional frames associated with another print arm, wherein the first and second series are arranged as intertwined spiral staircases.

3. The system of claim 1, wherein the three-dimensional printer has two or more print arms and one print arm processes one frame in the series simultaneously as another print arm processes another frame in the series.

4. The system of claim 3, wherein the frames are assigned to a print arm in one of: (i) a pre-defined schedule, (ii) a dynamically created schedule.

5. The system of claim 1, wherein a first frame in the series has a shape different than a shape of a second frame in the series.

6. The system of claim 5, wherein the shape of each frame varies based on the hatch angle.

7. The system of claim 1, wherein a first frame in the series has a width different than a width of a second frame in the series.

8. The system of claim 1, wherein a first frame in the series has an area different than an area of a second frame in the series.

9. The system of claim 1, wherein a first frame in the series has vertical height different than a vertical height of a second frame in the series.

10. The system of claim 1, wherein the frame creation computer processor incorporates an overlapping frame boundary avoidance technique.

11. The system of claim 10, wherein the overlapping frame boundary avoidance technique includes assigning a frame angle of 360/n to each frame, where n is at least one of: (i) not an integer, (ii) an irrational number, and (iii) a prime number.

12. The system of claim 1, wherein the frame creation computer processor incorporates a technique to ensure an overlapping frame boundary.

13. The system of claim 1, wherein a sector width for a rotary part is a whole number multiple of a rotary stage position resolution.

14. The system of claim 1, wherein the rotary three-dimensional printer is associated with a working scan field, and at least one frame is created based on the working scan field.

15. The system of claim 14, wherein a rotational speed of the rotary three-dimensional printer is dynamically adjusted based on the series of frames.

16. The system of claim 1, further comprising:
   the rotary three-dimensional printer, wherein the rotary three-dimensional printer is associated with a Direct Metal Laser Melting ("DMLM") process.

17. The system of claim 1, wherein the at least one electronic record defining the industrial asset item is associated with at least one of: (i) an image, (ii) a manufactured design, (iii) a cross-section, (iv) a binary Computer Aided Design ("CAD") file, and (v) a geometry file.

18. A computer-implemented method to facilitate creation of an industrial asset item via a rotary additive manufacturing process wherein a build plate rotates about a vertical axis and moves, relative to a print arm, along the vertical axis during printing, comprising:
receiving, at a frame creation computer processor from an industrial asset item definition data store, at least one electronic record defining the industrial asset item;
slicing, by the frame creation computer processor, the data defining the industrial asset item to create a series of two-dimensional frames helically arranged as a spiral staircase of steps, wherein a hatch angle associated with a frame of one revolution of the build plate and defined between a centerline of the frame and a scan line is different than the hatch angle associated with a frame of another revolution of the build plate, and wherein the hatch angle is incremented within frames of a single revolution of the build frame; and
outputting the sliced data indicative of the series of two-dimensional frames to be communicated to a rotary three-dimensional printer.

19. The medium of claim 18, wherein the frame creation computer processor incorporates an overlapping frame boundary avoidance technique, and wherein the overlapping frame boundary avoidance technique includes assigning a frame angle of 360/n to each frame, where n is at least one of: (i) not an integer, (ii) an irrational number, and (iii) a prime number.

20. A non-transitory, computer-readable medium storing instructions that, when executed by a computer processor, cause the computer processor to perform a method to facilitate creation of an industrial asset item via a rotary additive manufacturing process wherein a build plate rotates about a vertical axis and moves, relative to a print arm, along the vertical axis during printing, the method comprising:
receiving, at a frame creation computer processor from an industrial asset item definition data store, at least one electronic record defining the industrial asset item;
slicing, by the frame creation computer processor, the data defining the industrial asset item to create a series of two-dimensional frames helically arranged as a spiral staircase of steps, wherein a hatch angle associated with a frame of one revolution of the build plate and defined between a centerline of the frame and a scan line is different than the hatch angle associated with a frame of another revolution of the build plate, and wherein the hatch angle is incremented within frames of a single revolution of the build frame; and
outputting the sliced data indicative of the series of two-dimensional frames to be communicated to a rotary three-dimensional printer.

21. The medium of claim 20, wherein a first frame in the series has a shape different than a shape of a second frame in the series and the shape of each frame varies based on the hatch angle associated with each frame.

* * * * *